(12) United States Patent
Kim

(10) Patent No.: US 9,599,098 B2
(45) Date of Patent: Mar. 21, 2017

(54) SPRING MECHANISM

(71) Applicant: Charles Chongmu Kim, Downey, CA (US)

(72) Inventor: Charles Chongmu Kim, Downey, CA (US)

( * ) Notice: Subject to any disclaimer, the term of this patent is extended or adjusted under 35 U.S.C. 154(b) by 14 days.

(21) Appl. No.: 14/670,087

(22) Filed: Mar. 26, 2015

(65) Prior Publication Data

US 2015/0275866 A1     Oct. 1, 2015

Related U.S. Application Data

(60) Provisional application No. 61/971,264, filed on Mar. 27, 2014.

(51) Int. Cl.
   *F03G 1/02*                 (2006.01)
   *F03G 1/08*                 (2006.01)

(52) U.S. Cl.
   CPC    *F03G 1/02* (2013.01); *F03G 1/08* (2013.01)

(58) Field of Classification Search
   CPC ..... F03G 1/00; F03G 1/02; F03G 1/06; F03G 1/08
See application file for complete search history.

(56) References Cited

U.S. PATENT DOCUMENTS

| | | | | |
|---|---|---|---|---|
| 1,307,400 A | * | 6/1919 | Harris | F03G 1/00 185/39 |
| 3,209,863 A | * | 10/1965 | Dalton | F03G 1/00 185/37 |
| 4,609,088 A | * | 9/1986 | Takeuchi | F16F 15/1215 192/207 |
| 4,744,259 A | * | 5/1988 | Peterson | F03G 3/00 74/84 S |
| 5,042,159 A | * | 8/1991 | Millen | B44D 3/38 242/375.3 |
| 5,157,813 A | * | 10/1992 | Carroll | A43C 7/00 24/68 B |
| 6,880,677 B2 | * | 4/2005 | Chio | F03G 1/02 185/10 |
| 8,813,915 B2 | * | 8/2014 | Chio | F03G 1/02 185/10 |
| 8,870,111 B2 | * | 10/2014 | Kwankijpongsa | B65H 75/4431 242/378 |
| 9,302,623 B2 | * | 4/2016 | Melcher | F16F 7/104 |
| 2011/0057409 A1 | * | 3/2011 | Leeder | B60G 11/04 280/124.175 |

(Continued)

*Primary Examiner* — Alan B Waits
(74) *Attorney, Agent, or Firm* — Risso & Associates

(57) ABSTRACT

Described is a spring mechanism. The spring mechanism includes a leaf spring housing with leaf springs radially disposed within the leaf spring housing. The leaf springs being flexible between a rest state and tension state. A winding mechanism is engaged with the leaf springs for causing the leaf springs to flex from the rest state to the tension state. The winding mechanism includes a pushing pin wheel with a plurality of pushing pins protruding therefrom that rest against the leaf springs. The pushing pin wheel is rotatable such that rotation of the pushing pin wheel causes the leaf springs to flex from the rest state to a tension state. Release of the tension (i.e., when the leaf springs return to the rest state from the tension state) causes rotation of the leaf spring housing, which causes rotation of a corresponding release gear set and output drive.

19 Claims, 19 Drawing Sheets

(56) References Cited

U.S. PATENT DOCUMENTS

| | | | |
|---|---|---|---|
| 2012/0217085 A1* | 8/2012 | Sekikawa | B62D 5/0409 |
| | | | 180/444 |
| 2012/0300970 A1* | 11/2012 | Proll | B65H 75/48 |
| | | | 381/375 |
| 2016/0102438 A1* | 4/2016 | Kreische | E02D 3/074 |
| | | | 404/117 |
| 2016/0153518 A1* | 6/2016 | Melcher | F16F 15/022 |
| | | | 248/562 |

* cited by examiner

SPRING MECHANISM

CROSS-REFERENCE TO RELATED APPLICATIONS

This is a non-provisional application of U.S. Provisional Application No. 61/971,264, filed on Mar. 27, 2014, entitled, "Spring Mechanism."

BACKGROUND OF THE INVENTION (1) Field of Invention

The present invention relates to a spring mechanism and, more particularly, to a spring mechanism that includes a plurality of leaf springs.

(2) Description of Related Art

Springs have long been known in the art and come in a variety of forms. Leaf springs, for example, provide a spring force via bending of the leaf. To increase the spring force, vehicles often employ a stack of leaf springs (e.g., three leaf springs). Thus, in this example, the vehicle's suspension is supported by leaf spring stacks. While highly functional for such vehicular suspension systems, a leaf spring stack provides a spring or return force in a singular vertical direction (as opposed to a rotational direction).

Thus, a continuing need exists for a spring mechanism that includes a plurality of leaf springs to provide a rotational spring force.

SUMMARY OF INVENTION

The present invention is directed to a spring mechanism. The spring mechanism includes a leaf spring housing rotatably mounted in an enclosure, with a plurality of leaf springs radially disposed within the leaf spring housing. The leaf springs are flexible between a rest state and tension state. A winding mechanism is operably engaged with the leaf springs for causing the leaf springs to flex from the rest state to the tension. The winding mechanism includes a pushing pin wheel with a plurality of pushing pins protruding therefrom. The pushing pin wheel is positioned proximate to the leaf spring housing such that each pushing pin rests against a leaf spring. The pushing pin wheel is rotatable such that rotation of the pushing pin wheel causes the leaf springs to flex from the rest state to a tension state. Release of the tension (i.e., when the leaf springs return to the rest state from the tension state) causes rotation of the leaf spring housing, which causes rotation of a corresponding release gear set and output drive.

In another aspect, the leaf spring housing includes an inner hub, with the leaf springs radially disposed around the inner hub.

In another aspect, the leaf spring housing includes an outer wall with a plurality of outer spring holds, and wherein the inner hub includes a plurality of inner spring holds, such that the leaf springs are affixed between the outer spring holds and the inner spring holds.

In yet another aspect, the leaf spring housing includes a plurality of protruding peg pairs, with a leaf spring positioned adjacent to each protruding peg pair such that the protruding peg pair stops further flexion of the leaf springs when transitioning between the rest state and tension state.

In another aspect, a gear plate is affixed with the enclosure. The gear plate affixes the pushing pin wheel in place with respect to the leaf springs and leaf spring housing.

In yet another aspect, the spring mechanism includes a winding gear operably engaged with the pushing pin wheel; a winding gear set supported by the gear plate and operably engaged with the pushing pin wheel; and a winding device operably connected with the winding gear set, such that upon actuation of the winding device, the winding gear set is actuated to cause rotation of the winding gear and the pushing pin wheel, which causes the leaf springs to flex from the rest state to the tension state.

In another aspect, the spring mechanism includes a leaf spring housing reverse rotating stopper engaged with the leaf spring housing to stop the leaf spring housing from reversing, thereby allowing the leaf spring housing to rotate in a single direction; and a pin wheel reverse rotating stopper engaged with the pushing pin wheel to stop the pushing pin wheel from reversing, thereby allowing the pushing pin wheel to rotate single direction in winding of the spring mechanism.

In yet another aspect, the spring mechanism includes a release gear operably engaged with the leaf spring housing; a release gear set supported by the gear plate and operably engaged with the release gear; and an output drive operably engaged with the release gear set, whereby that upon actuation of the spring mechanism, the leaf springs release tension and return to the rest state from the tension state, which causes rotation of the leaf spring housing and rotation of the release gear and corresponding release gear set to cause rotation of the output drive.

In another aspect, the plurality of protruding peg pairs are substantially centrally disposed between the inner hub and outer wall or, alternatively, are positioned closer toward the outer wall.

In yet another aspect, the leaf springs are straight in the rest state and bent in the tension state or, alternatively, are bent in the rest state and straight in the tension state.

Finally, as can be appreciated by one in the art, the present invention also comprises a method for forming and using the using the invention described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a spring mechanism and, more particularly, to a spring mechanism that includes a plurality of leaf springs. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

(1) Description

Figure 17:
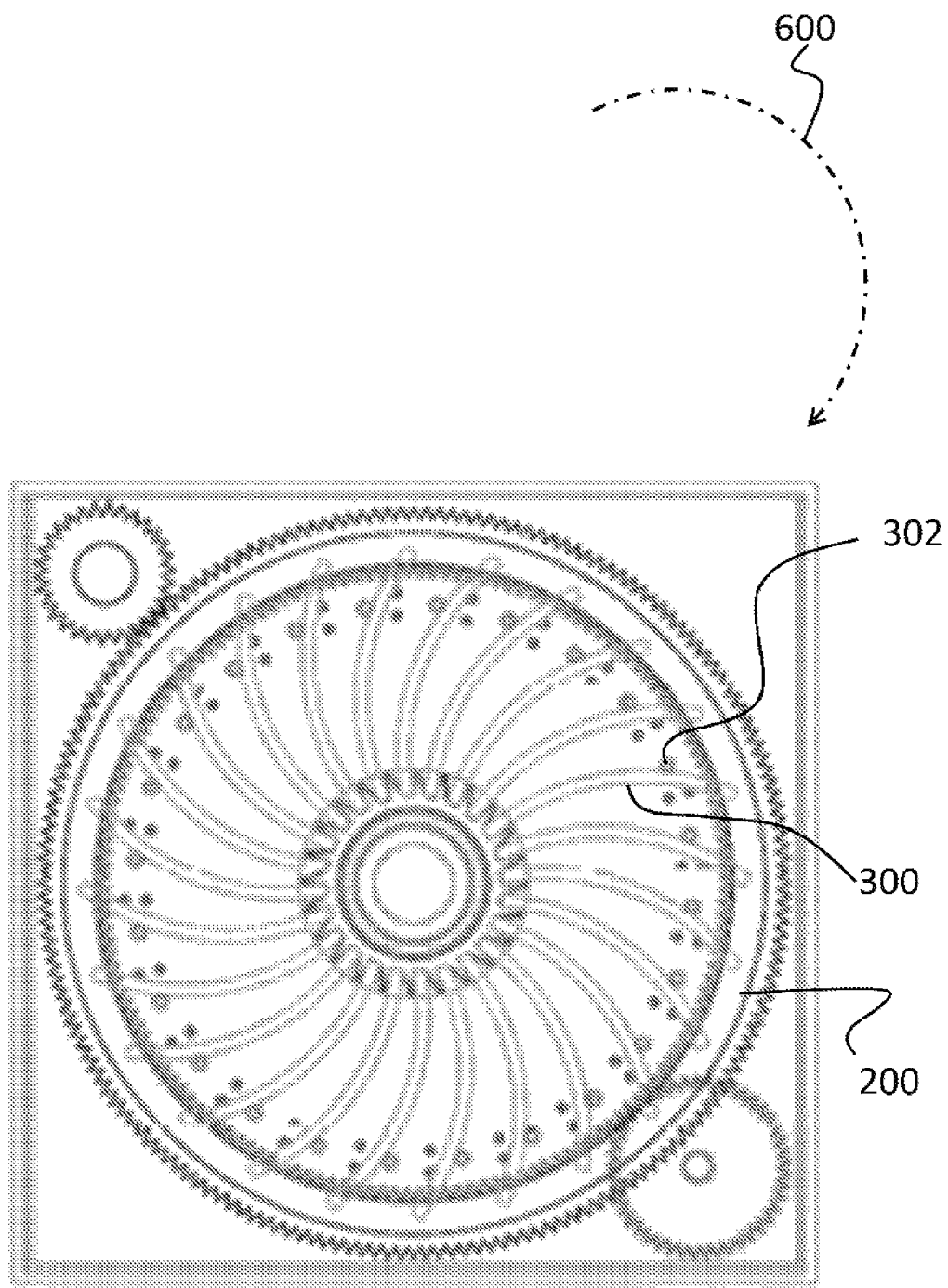
FIG. 17 is an illustration depicting rotation of the pushing pin wheel to cause the leaf springs to flex into full tension according to the principles of the present invention.
Figure 18:
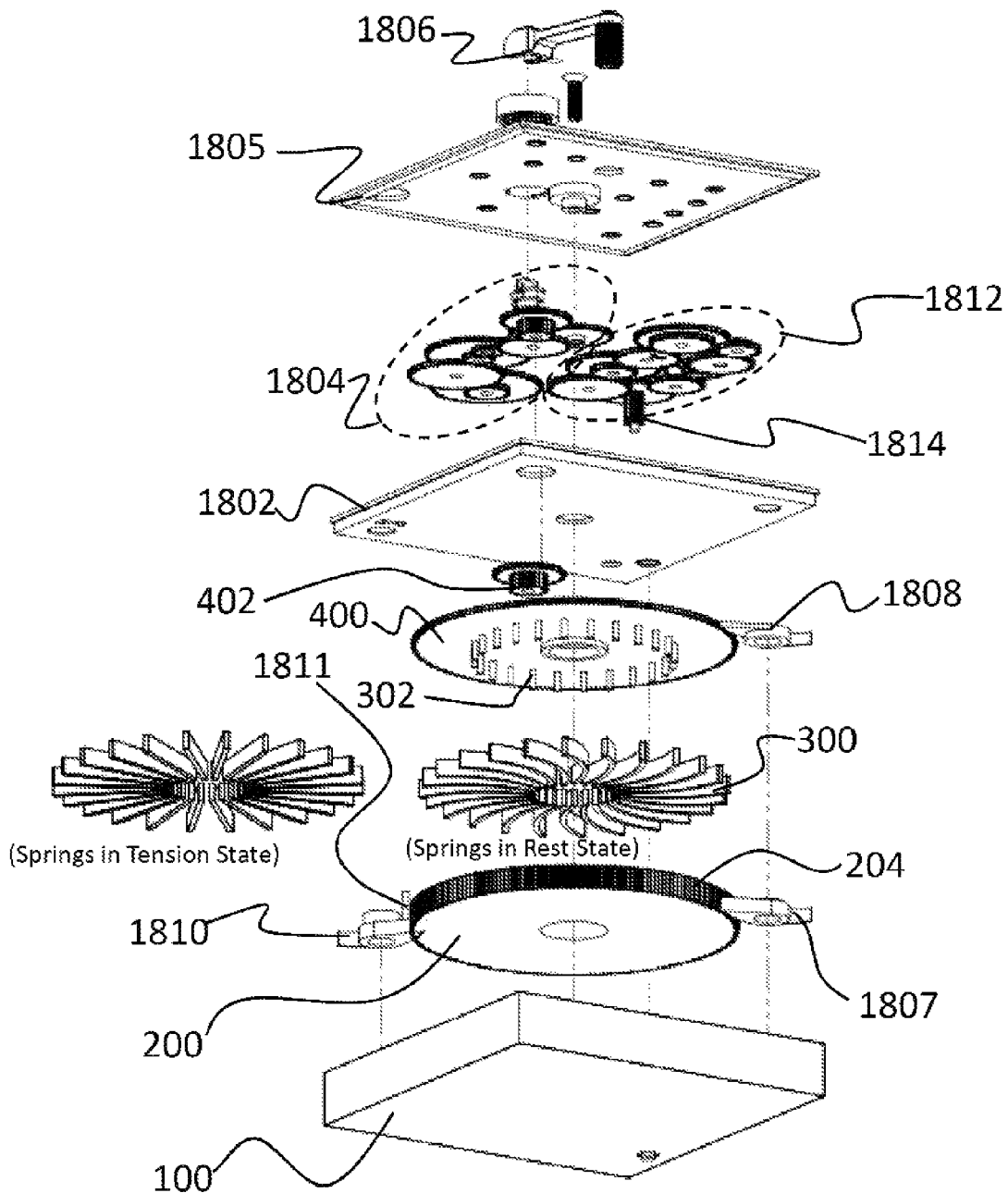
FIG. 18 is a bottom, exploded-view illustration of a spring mechanism according to the principles of the present invention.
Figure 19:
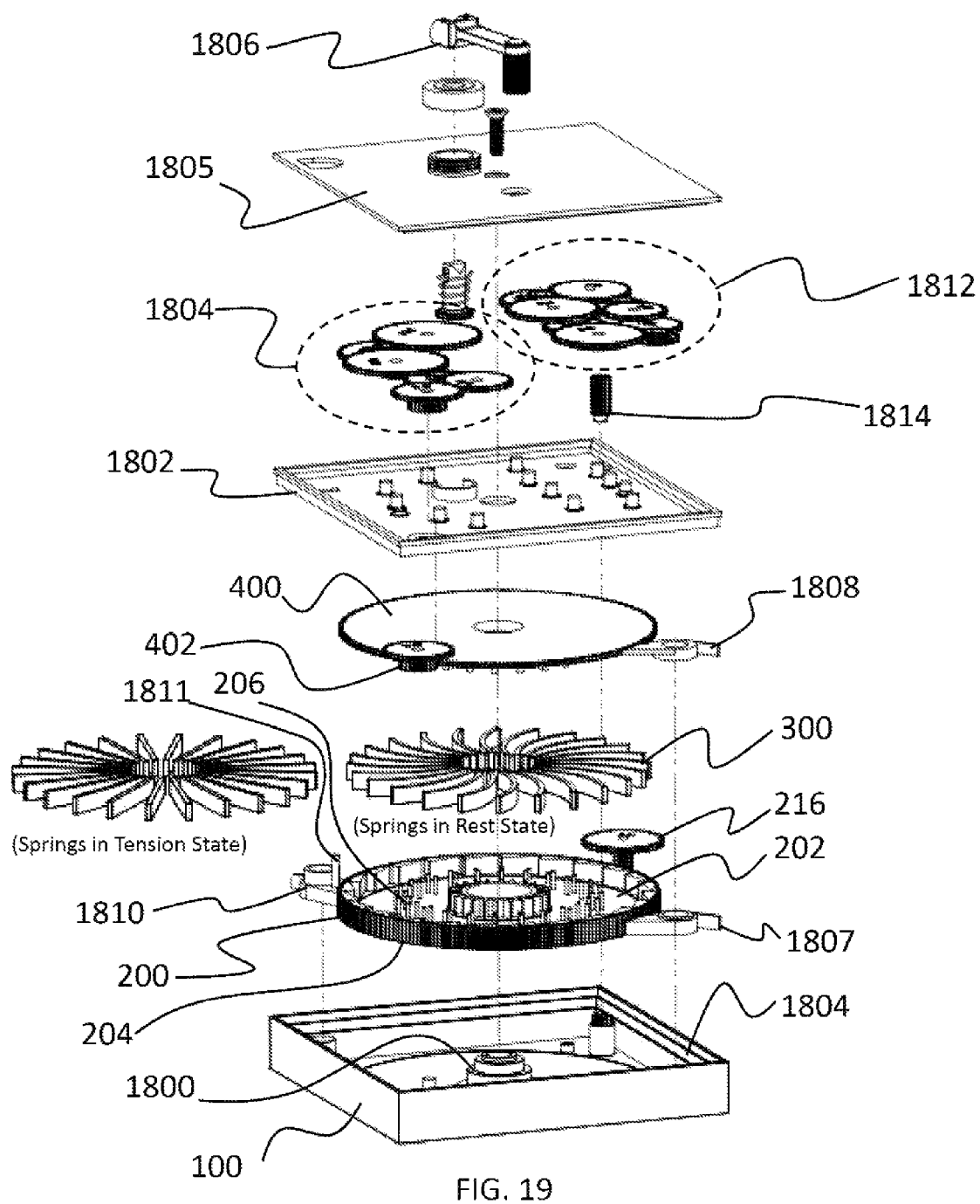
FIG. 19 is a top, exploded-view illustration of the spring mechanism according to the principles of the present invention.

The present invention is directed to a spring mechanism that includes a plurality of leaf springs to provide a rotational spring force. In general, the spring mechanism includes an enclosure with plurality of leaf springs that are either bent or straightened (depending on the particular implementation) to provide the rotational spring force. For further understanding, FIGS. 1 through 17 depict various components that are incorporated into the spring mechanism, while FIGS. 18 and 19 illustrate an exploded view of a complete spring mechanism according to the principles of the present invention. Specifically, FIGS. 1 through 6 provide an example of one aspect, in which the leaf springs are curved at rest (rest state) and straight (tension state) when wound to provide the spring force. Alternatively, FIGS. 7 through 12 provide another non-limiting example, in which the leaf springs are straight at rest (rest state) and bent or curved (tension state) when wound to provide the spring force. Additionally, FIGS. 13 through 17 illustrate yet another aspect where a position of a pushing wheel post on the pushing wheel is located toward a periphery of the pushing wheel (as opposed to being centrally located between the midpoint and periphery). These aspects will be further described below.

Figure 1:
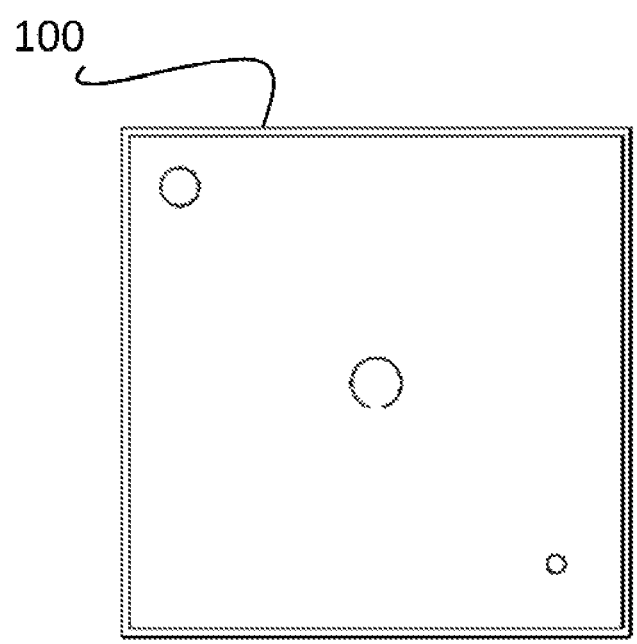
FIG. 1 is an illustration of an enclosure according to the principles of the present invention.
Figure 2:
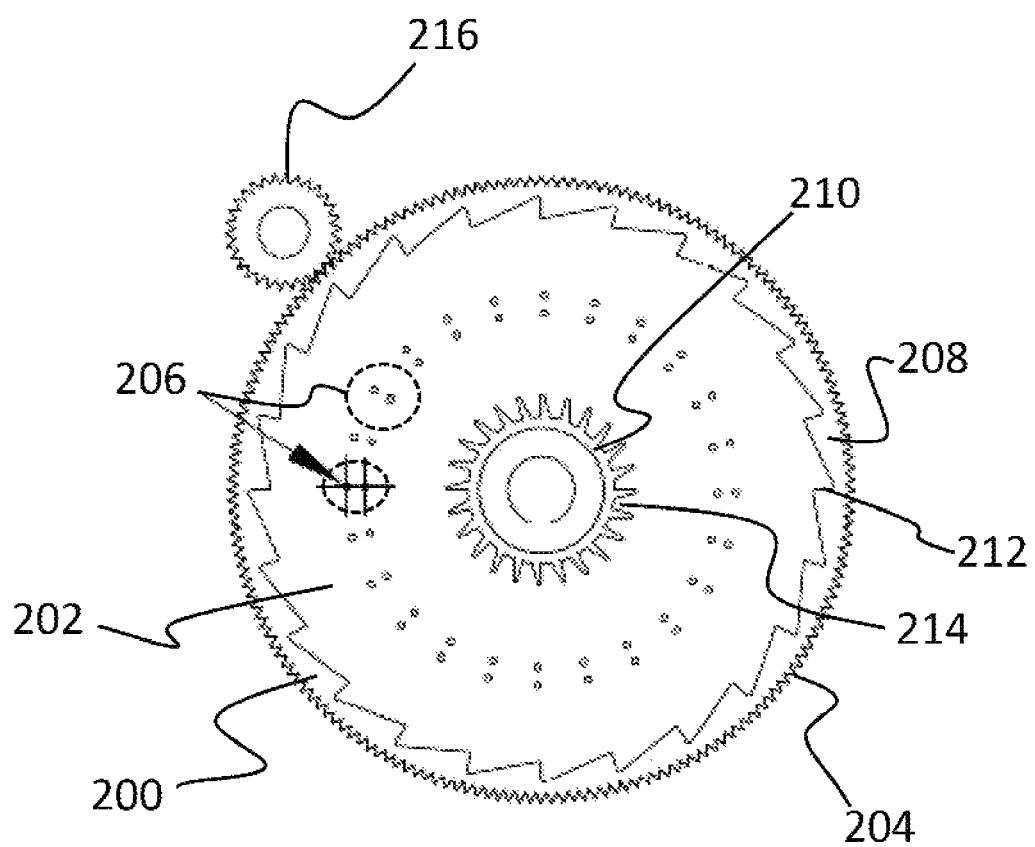
FIG. 2 is an illustration of a leaf spring housing and a release gear according to the principles of the present invention.

As shown in FIG. 1 and as noted above, the spring mechanism requires some an enclosure 100 to hold the various components. The enclosure 100 can be specifically devised as a standalone component (as illustrated) for the spring mechanism or incorporated into or integrally formed with a larger item or device that is intended to use the spring mechanism as described herein. FIG. 2 illustrates a leaf spring housing 200 that is formed to house the leaf springs. As shown in FIG. 2 and further illustrated in FIG. 19, the leaf spring housing 200 includes a recess 202 that accommodates the leaf springs (depicted as element 300 in FIG. 20). Also shown is a gear pattern 204 that surrounds the leaf spring housing 200 and a plurality of protruding peg pairs 206 that are positioned with the recess 202. The leaf spring housing 200 includes an outer wall 208 and an inner hub 210. The outer wall 208 includes a plurality of outer spring holds 212 while the inner hub 210 includes a plurality of inner spring holds 214. Also shown is a release gear 216 operably engaged with the gear pattern 204 of the leaf spring housing 200.

Figure 3:
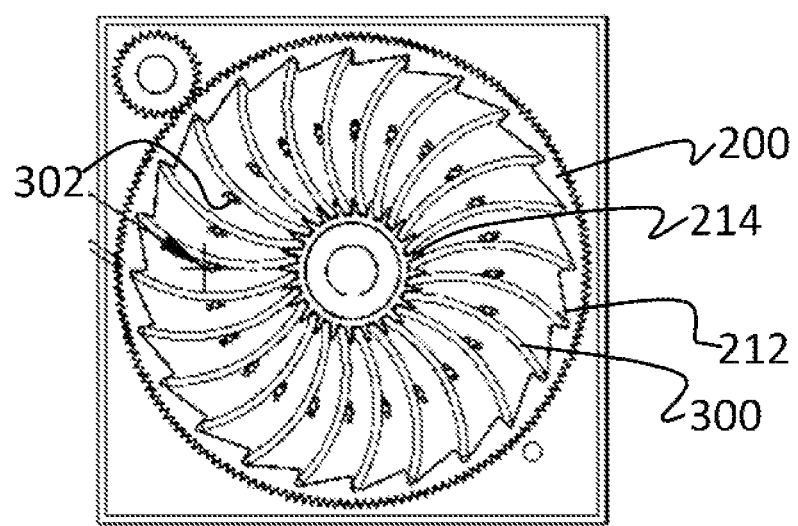
FIG. 3 is an illustration depicting the leaf spring housing positioned within the enclosure, with a plurality of leaf springs positioned within the leaf spring housing according to the principles of the present invention.
Figure 4:
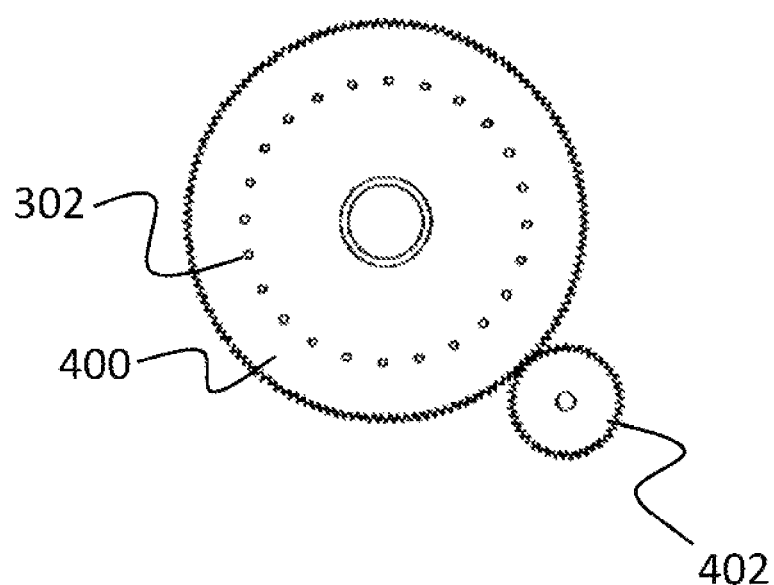
FIG. 4 is an illustration of a pushing pin wheel and winding gear according to the principles of the present invention.

As evident in FIG. 3, the outer and inner spring holds 212 and 214 are formed to hold the leaf springs 300 within the leaf spring housing 200. FIG. 3 illustrates the leaf spring housing 200 as positioned within the enclosure 100, with the leaf springs 300 positioned within the leaf spring housing 200. Specifically, FIG. 3 depicts the plurality of leaf springs 300 at a rest position positioned within the leaf spring housing 200. Note that the center circle between the peg pairs (that is newly depicted in FIG. 3 but not present in FIG. 2) is a pushing pin 302 that protrudes down from a pushing pin wheel (depicted as element 400 in FIGS. 4, 18, and 19). For further understanding, FIG. 4 is an illustration of the pushing pin wheel 400. Note that the pushing pins 302 are positioned around the pushing pin wheel 400. As will be further described below, the pushing pins 302 are used to engage with the leaf spring and straighten the leaf spring when the pushing pin wheel 400 is rotated (wound). Also shown is a winding gear 402 engaged with the gear teeth of the pushing pin wheel 400 to rotate the pushing pin wheel 400. Thus, the spring mechanism includes any suitable winding mechanism for engaging with the leaf springs and causing the leaf springs to move from a rest state to a tension state, a non-limiting example of which includes the winding gear 402, pushing pin wheel 400, the pushing pins 302, the winding gear 402 and a corresponding winding gear set (depicted as element 1804 in FIG. 18).

Figure 5:
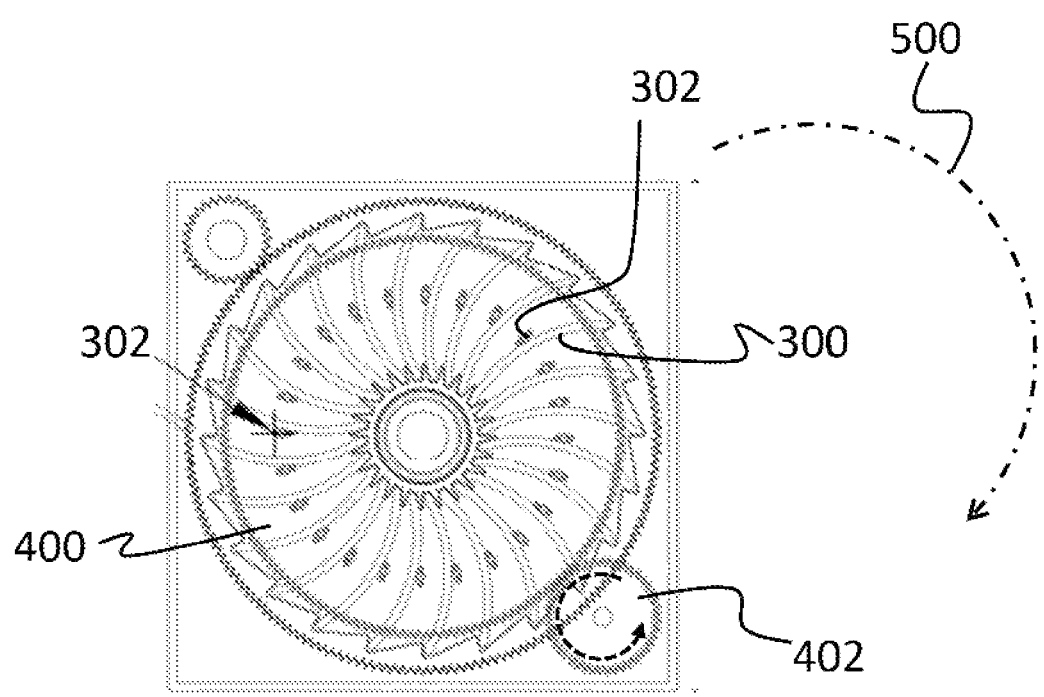
FIG. 5 is an illustration depicting the pushing pin wheel positioned over the leaf springs according to the principles of the present invention.
Figure 6:
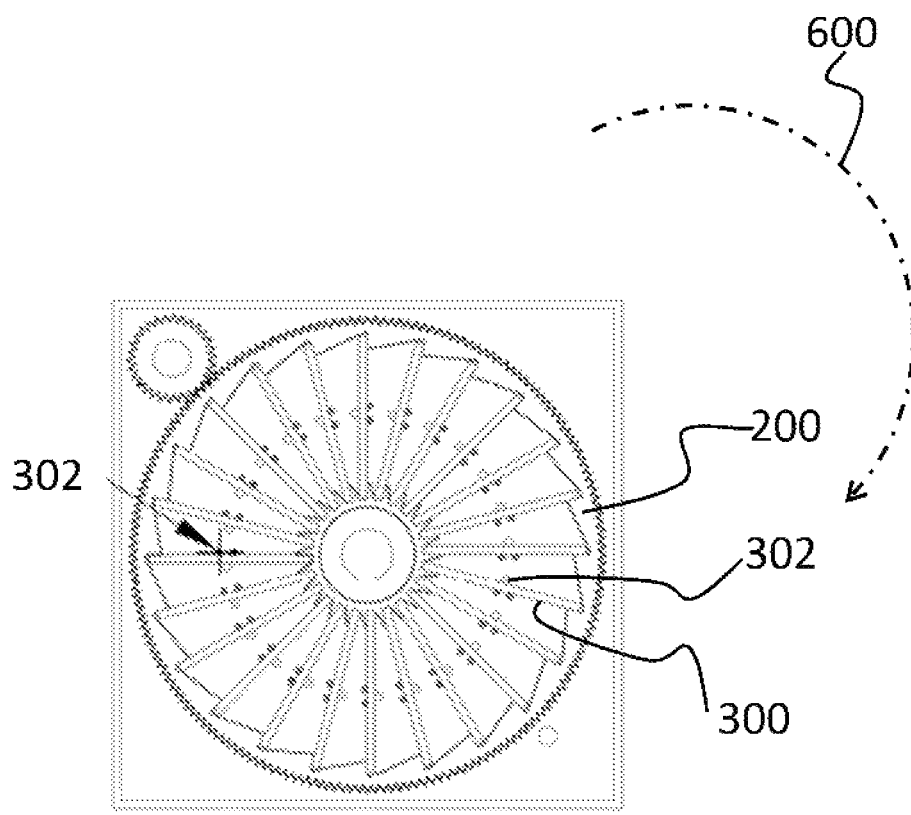
FIG. 6 is an illustration depicting rotation of the pushing pin wheel to cause the leaf springs to flex into fall tension according to the principles of the present invention.

For example, FIG. 5 illustrates the pushing pin wheel 400 of FIG. 4, showing the pushing pins 302 of the pushing pin wheel 400 against the leaf springs 300, with the leaf springs 300 in a rest position (bent in this aspect). As the pushing pin wheel 400 is rotated by the winding gear 402, the pushing pins 302 straighten the leaf springs 300. For example, FIG. 6 illustrates the leaf springs 300 in full tension as the pushing pins 302 forced the leaf springs 300 straight and into full tension. For illustrative purposes, the pushing pin wheel 400 has been removed from this illustration while leaving the pushing pins 302 to illustrate the effect the pushing pins 302 have on causing the leaf springs 300 to go from rest to full tension. To release the tension provided by the leaf springs 300, the leaf spring housing 200 must rotate 600, which provides the spring force according to the principles of the present invention. As can be appreciated by those skilled in the art, any suitable number of leaf springs 300 may be used, with each leaf spring 300 adding to the rotational force of the spring mechanism.

It should be understood that the pushing pin wheel rotates in a single direction to wind the spring mechanism which can optionally lock (via gears or any other suitable mechanism or device). When unlocked, the leaf spring housing 200 unwinds by rotating 600 in one direction (i.e., the same direction as the pushing pin wheel (either clockwise or counter-clockwise, depending on the particular implementation). As a non-limiting example, the pushing pin wheel rotates clockwise, with the leaf spring housing 200 unwinding by similarly rotating 600 clockwise. Alternatively, both the pushing pin wheel and leaf spring housing 200 can rotate counter-clockwise. The spring mechanism is to be used with a toy or any other device that can optionally include an on/off switch (with a lock) to stop the leaf spring housing 200 from moving freely and, thereby, prevent it from unwinding unless it is unlocked. This allows the user to control the unwinding function of the spring mechanism. This aspect of a lock can be applied to all aspects described herein. For further understanding, FIGS. 18 and 19 provide an exploded-view illustration of a complete spring mechanism according to the principles of the present invention, depicting the aspect as described above with respect to FIGS. 1 through 6. It should be understood that although the aspects depicted in FIGS. 7 through 17 illustrate a different leaf spring or pushing pin position, the general concept is the same and can be incorporated into a complete spring mechanism as depicted in FIGS. 18 and 19.

Figure 7:
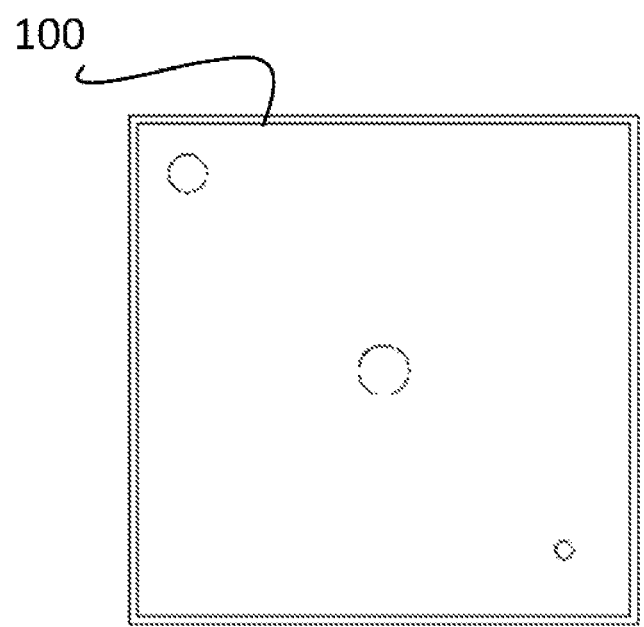
FIG. 7 is an illustration of the enclosure according to the principles of the present invention.
Figure 8:
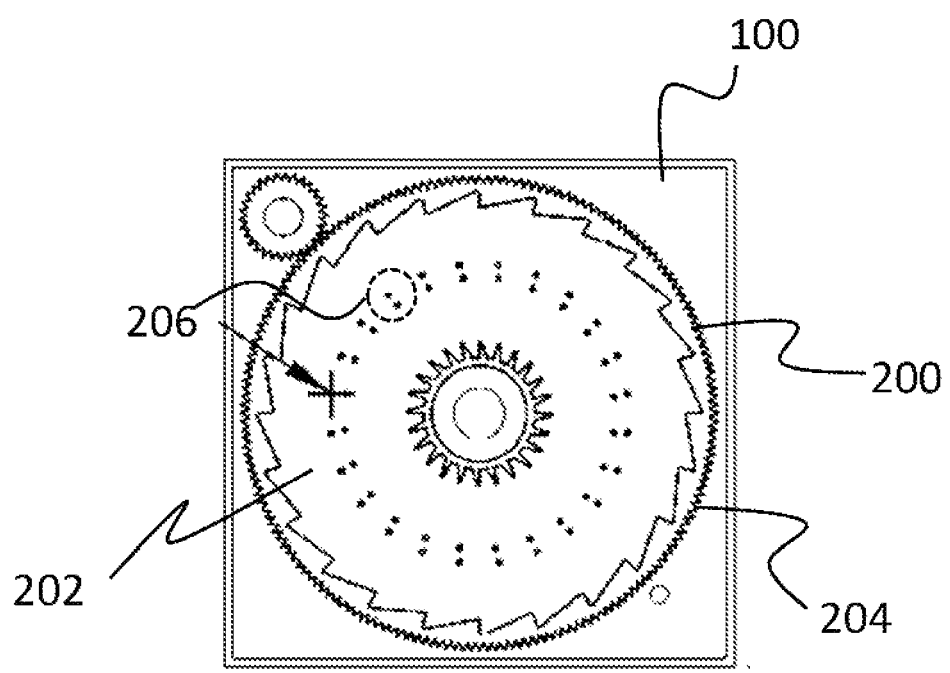
FIG. 8 is an illustration of the leaf spring housing and release gear as positioned within the enclosure according to the principles of the present invention.

As noted above, FIGS. 7 through 12 illustrate an alternative aspect, in which the leaf springs 300 are straight at rest and bent or curved when wound to provide the spring force. Specifically, FIG. 7 illustrates the enclosure 100 while FIG. 8 illustrates the leaf spring housing 200 as positioned within the enclosure 100. Note the example of a gear pattern 204 and the plurality of protruding peg pairs 206 that are positioned with the recess 202.

Figure 9:
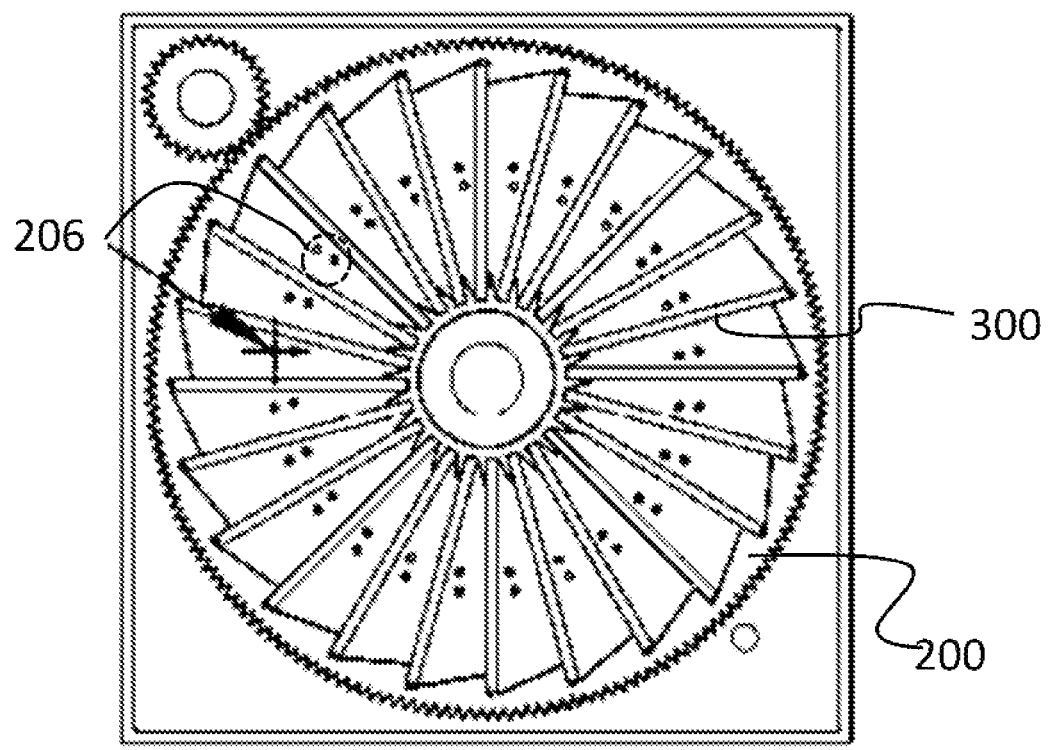
FIG. 9 is an illustration depicting the leaf spring housing positioned within the enclosure, with a plurality of leaf springs positioned within the leaf spring housing according to the principles of the present invention.
Figure 10:
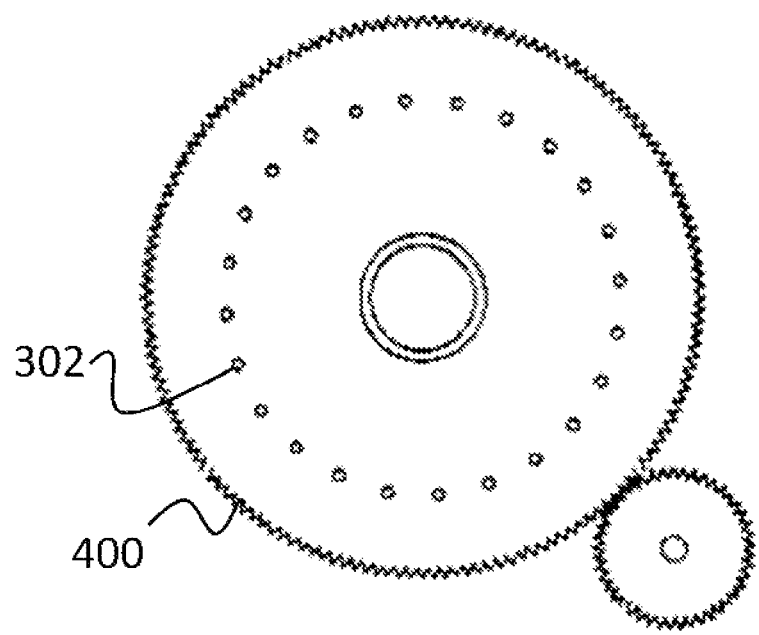
FIG. 10 is an illustration of the pushing pin wheel and winding gear according to the principles of the present invention.

FIG. 9 illustrates the plurality of leaf springs 300 at a rest position positioned within the leaf spring housing 200. Note that the protruding peg pairs 206 are not engaged with the leaf springs 300. FIG. 10 is an illustration of a pushing pin wheel 400. Note that pushing pins 302 are positioned around the pushing pin wheel 400. As noted above, the pushing pins 302 are used to engage with the leaf spring and bend the leaf spring when the pushing pin wheel 400 is rotated.

Figure 11:
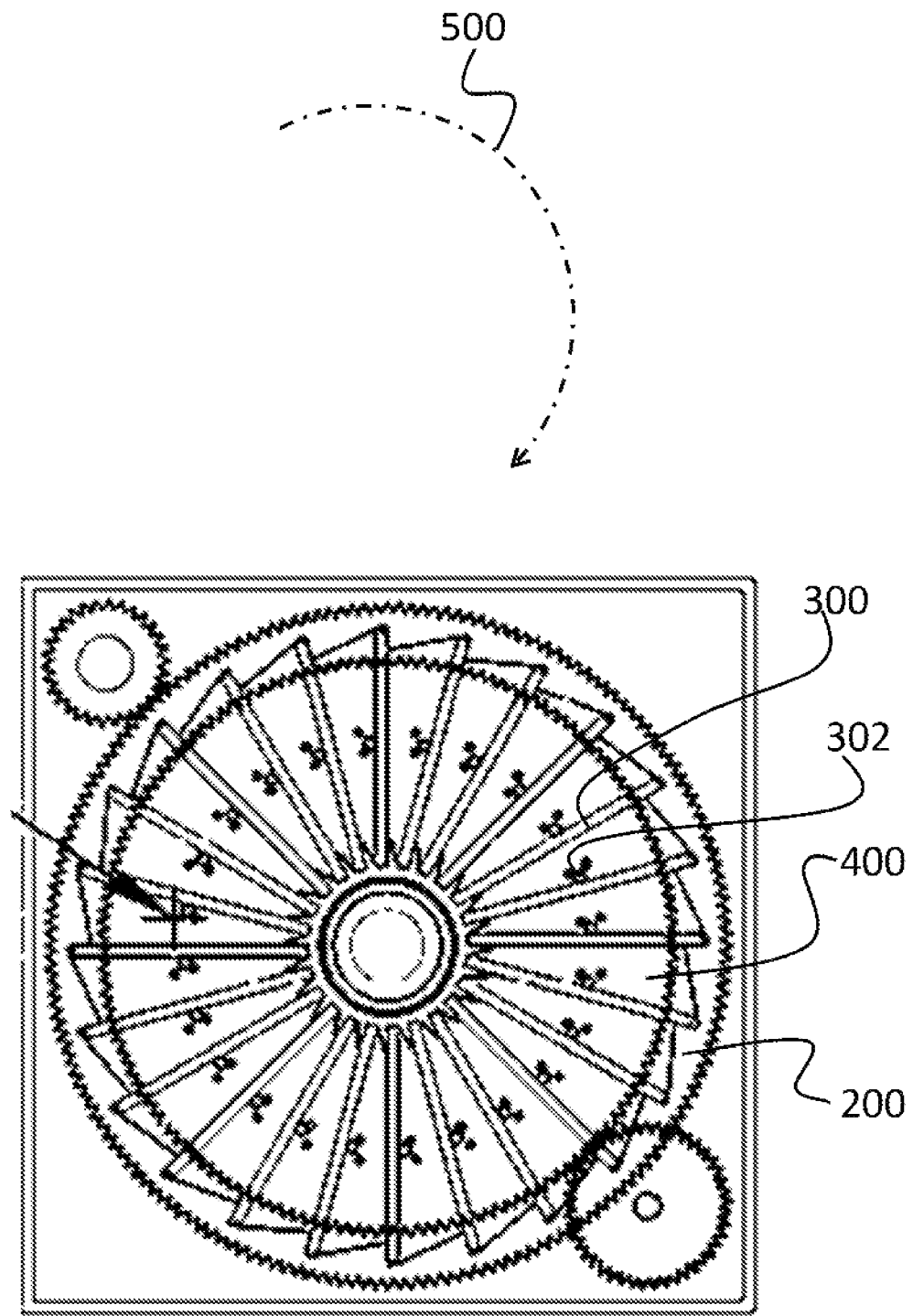
FIG. 11 is an illustration depicting the pushing pin wheel positioned over the leaf springs according to the principles of the present invention.
Figure 12:
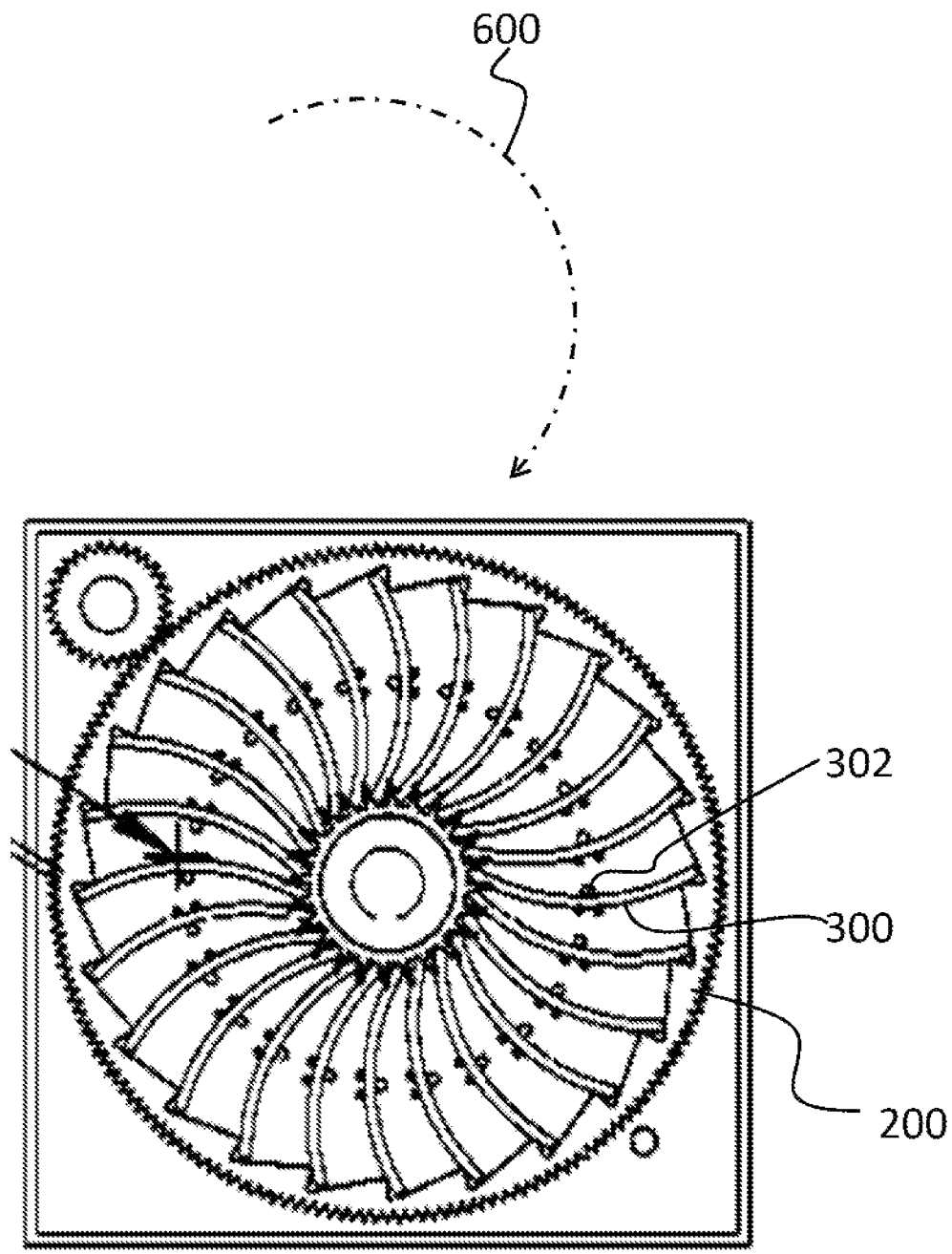
FIG. 12 is an illustration depicting rotation of the pushing pin wheel to cause the leaf springs to flex into full tension according to the principles of the present invention.

For example, FIG. 11 is a layer-view illustration, depicting the pushing pin wheel 400 of FIG. 10 as positioned on top of the leaf spring housing 200. Notably, the pushing pins 302 of the pushing pin wheel 400 are positioned against the leaf springs 300, with the leaf springs 300 in a rest position. As the pushing pin wheel is rotated 500, the pushing pins 302 bend the leaf springs 302. For example, FIG. 12 illustrates the leaf springs 300 in full tension as the pushing pins 302 force the leaf springs 300 bent and into full tension. For illustrative purposes, the pushing pin wheel has been removed from FIG. 12 while leaving the pushing pins 302 to illustrate the effect the pushing pins 302 have on causing the leaf springs 300 to go from rest to full tension. To release the tension provided by the leaf springs 300, the leaf spring housing must rotate 600, which provides the spring force according to the principles of the present invention.

Figure 13:
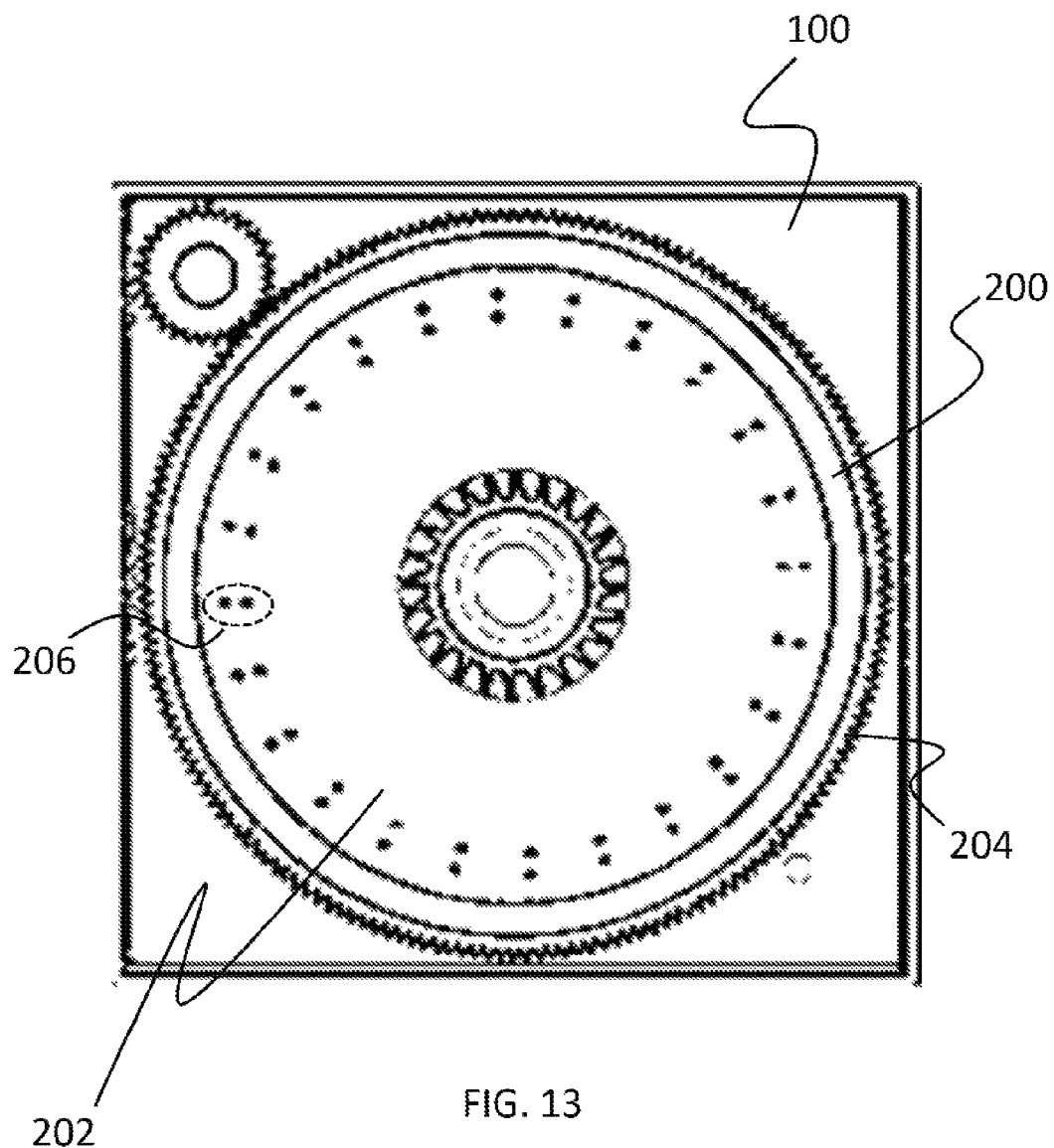
FIG. 13 is an illustration of the leaf spring housing and release gear as positioned within the enclosure according to the principles of the present invention.

As noted above, FIGS. 13 through 17 illustrate an alternative aspect, in which a position of a pushing pin 302 on the pushing pin wheel 400 is located toward a periphery of the pushing pin wheel 400 (as opposed to being substantially centrally located between the midpoint and periphery (as illustrated in FIGS. 4 and 10)). Thus, it should be understood that the pushing pin 302 can be positioned at any desired location on the pushing pin wheel 400, with the example placement positions as illustrated in FIGS. 1 through 17 being non-limiting examples of suitable placement positions. For example, FIG. 13 illustrates the enclosure 100 with the leaf spring housing 200 positioned therein. Note the example of a gear pattern 204 and the plurality of protruding peg pairs 206 that are positioned within the recess 202. Also note that the protruding peg pairs 206 are offset toward the periphery of the recess 202, as compared to that as illustrated in FIGS. 1 through 12.

Figure 14:
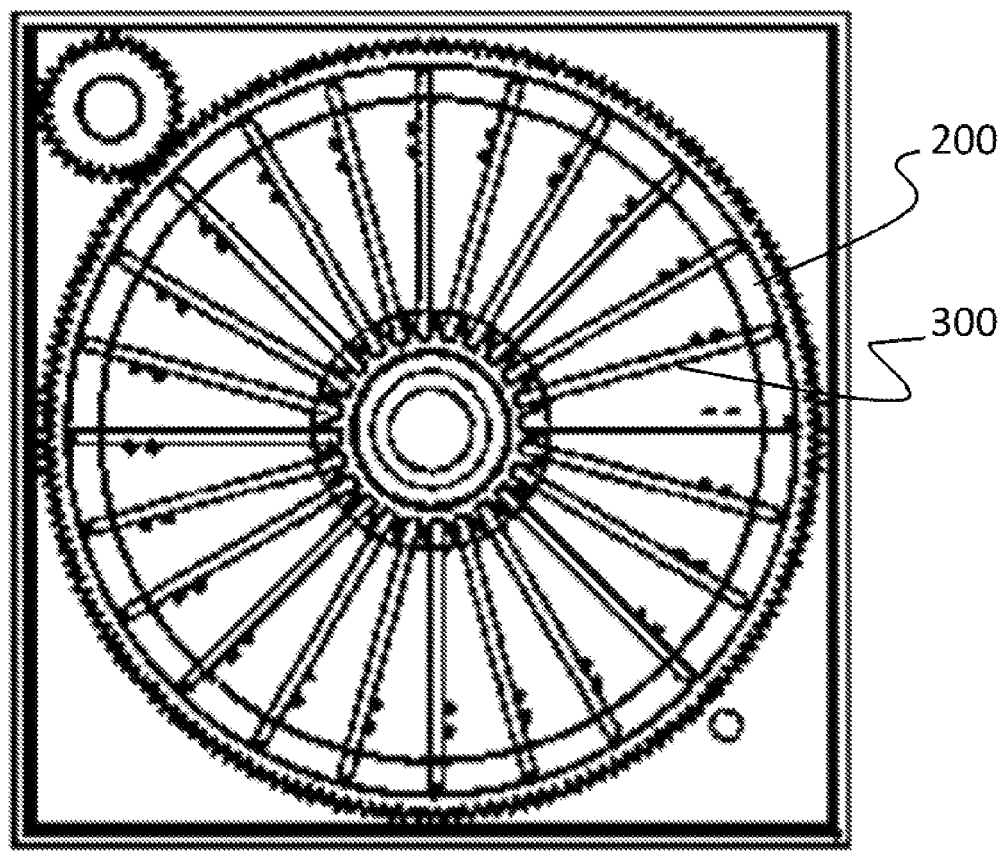
FIG. 14 is an illustration depicting the leaf spring housing positioned within the enclosure, with a plurality of leaf springs positioned within the leaf spring housing according to the principles of the present invention.
Figure 15:
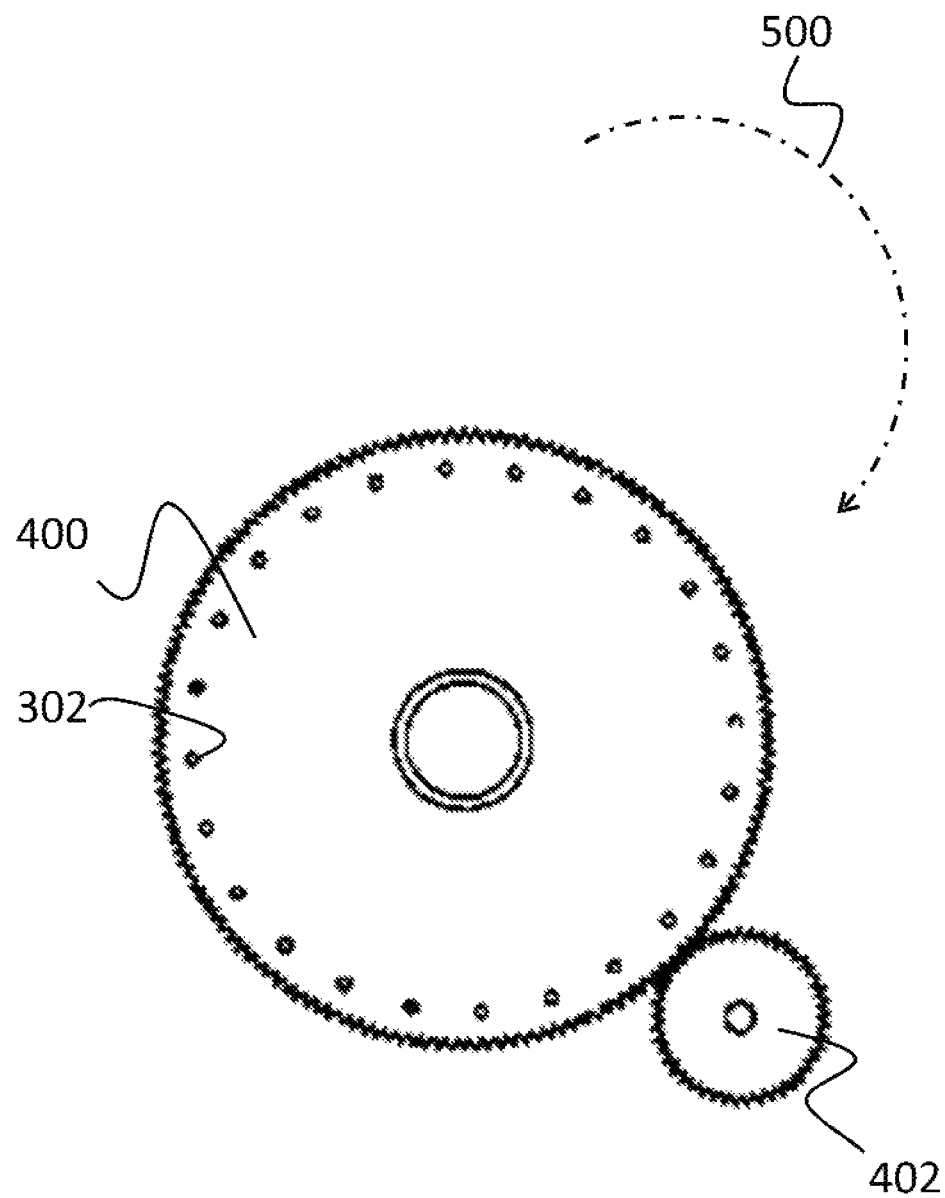
FIG. 15 is an illustration of the pushing pin wheel and winding gear according to the principles of the present invention.

FIG. 14 illustrates the plurality of leaf springs 300 at a rest position positioned within the leaf spring housing 200. FIG. 15 is an illustration of the corresponding pushing pin wheel 400. Note the pushing pins 302 that are positioned around the pushing wheel. As was the case above, the pushing pins 302 are used to engage with the leaf spring and bend the leaf spring when the pushing pin wheel 400 is rotated 500 (via the winding gear 402). Importantly, in this non-limiting example, the pushing pins 302 are positioned toward the periphery of the pushing pin wheel 400 (as opposed to being more centrally located as illustrated in FIGS. 1 through 12). It should be understood that the pushing pins 302 can be positioned at any desired location. For example, they are centrally located in FIGS. 1 through 12, toward the periphery as illustrated in FIGS. 13 through 17, and can also be more toward the central point (i.e., closer toward the inner hub than that illustrated in FIGS. 1 through 12).

Figure 16:
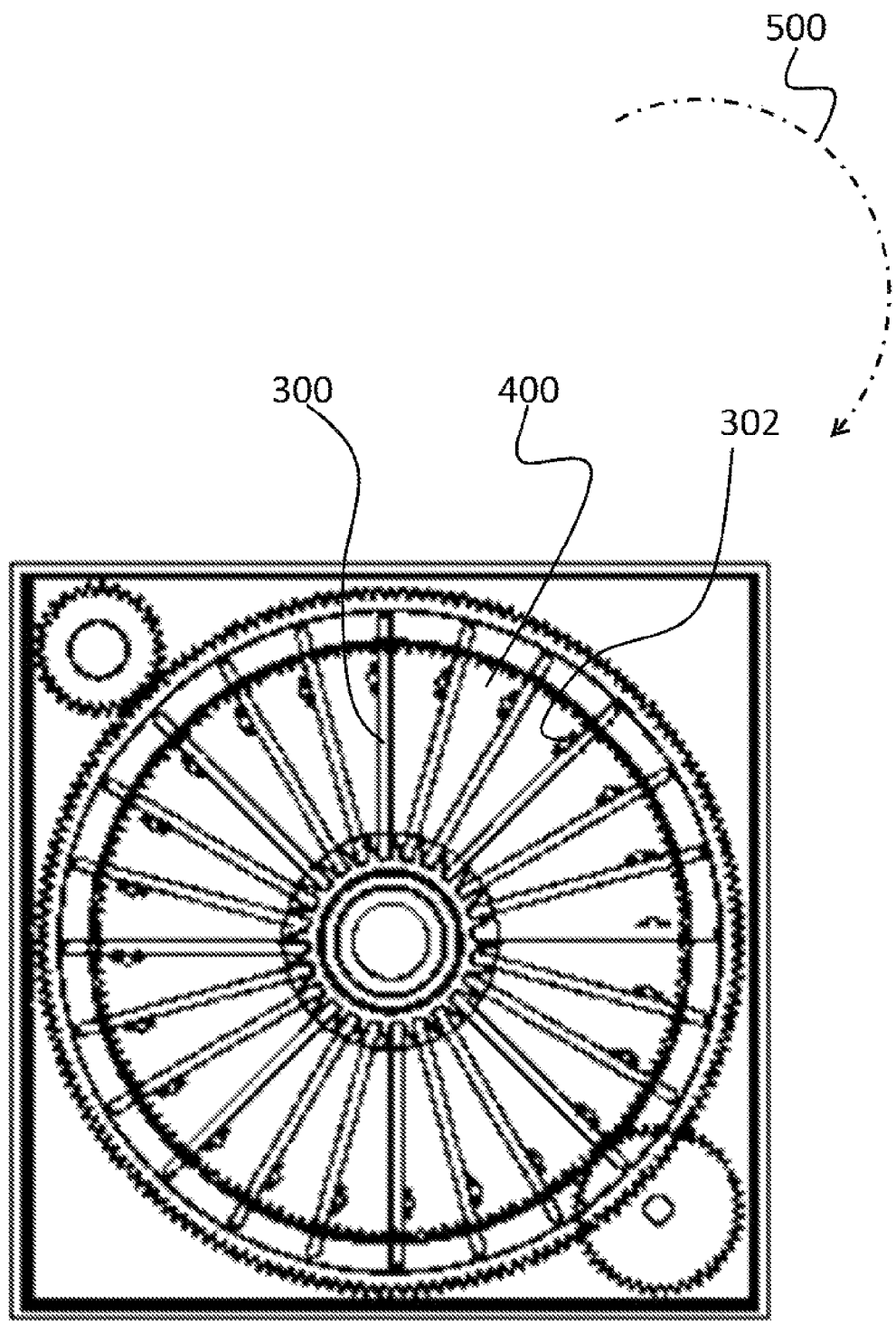
FIG. 16 is an illustration depicting the pushing pin wheel positioned over the leaf springs according to the principles of the present invention.

For example, FIG. 16 is a layered-view illustration, depicting the pushing pin wheel 400 of FIG. 15, showing the pushing pins 302 positioned against the leaf springs 300, with the leaf springs 300 in a rest position. As the pushing pin wheel 400 is rotated, the pushing pins 302 bend the leaf springs 300. For example, FIG. 17 illustrates the leaf springs 300 in full tension as the pushing pins 302 force the leaf springs 300 bent and into a full tension position. To release the tension provided by the leaf springs 300, the leaf spring housing 200 must rotate, which in turn rotates the release gear 216 and provides the spring force according to the principles of the present invention.

It should be noted that although the images as illustrated in FIGS. 1 through 17 are depicted as two-dimensional, the spring mechanism as illustrated is a three-dimensional component that allows for operation of said spring mechanism. For example, FIGS. 18 and 19 depict bottom and top-views, respectively, of the spring mechanism according to the principles of the present invention.

As shown, the leaf spring housing 200 fits within the enclosure 100 in a rotatable fashion. For example, the leaf spring housing 200 is rotatably positioned around an enclosure hub 1800. The leaf springs 300 are positioned within the leaf spring housing 200, between the protruding peg pairs 206. The pushing pin wheel 400 is rotatable positioned over the leaf spring housing 200, such that its pushing pins 302 reside adjacent to a leaf spring 300. A gear plate 1802 or any other lid or covering mechanism or device can be used to affix the pushing pin wheel 400 in place with respect to the leaf springs 300 and leaf spring housing 200. Thus, in this example, the gear plate 1802 fits within a recess 1804 within the enclosure 100 to lock the pushing pin wheel 400, leaf springs 300, leaf spring housing 200, winding gear 402, and release gear 216 within the enclosure 100.

The winding gear 402 is operably engaged with a winding gear set 1804 that is supported by the gear plate 1802. The winding gear set 1804 is affixed within the gear plate 1802 using a cover 1805 or other suitable mechanism or device for affixing a gear set in place. A winding handle 1806 or other suitable winding device is operably connected with the winding gear set 1804. Thus, rotation of the winding handle 1806 causes rotation of the winding gear set 1804, the winding gear 402, and pushing pin wheel 400, which causes flexion of the leaf springs 300 and winding of the spring mechanism. In other words, by flexing the leaf springs 300, the leaf springs 300 are straightened (or bent, as the case may be) which causes tension in the leaf springs 300 as they want to return to the bent state (or straight state as the case may be). The more the leaf springs 300 are straightened, the more wound the system is. For example, FIGS. 18 and 19 depict examples of the leaf springs 300 in the rest state and full tension state.

The spring mechanism also includes a leaf spring housing reverse rotating stopper 1807 to stop the leaf spring housing 200 from reversing, thereby allowing it to rotate in a single direction. Further, a pin wheel reverse rotating stopper 1808 is included that allows for single direction winding of the spring mechanism. In other words, the pin wheel reverse rotating stopper 1808 and the leaf spring housing reverse rotating stopper 1807 only allow the pushing pin wheel 400 and leaf spring housing 200 to be wound in a rotate in a single direction. A spring release 1810 is also included. The spring release 1810 is rotatable within the spring mechanism and includes, for example, a pointed tip that engages with the gear pattern of the leaf spring housing 200. Upon actuation of the spring release 1810 (via, for example, a tab 1811 that projects out of the cover 1805), the leaf spring housing 200 is free to release the tension provided by the leaf springs 300. In doing so, the leaf spring housing 200 rotates the release gear 216, which in turn rotates a release gear set 1812 affixed with the spring mechanism. As a non-limiting example and as illustrated, the release gear set 1812 is rotatably affixed within the gear plate 1802. It should be noted that the various gear sets (i.e., gear trains) and gears are sized to provide the desired torque and gear speed as may be needed in any given application or implementation. Thus, the examples of specific gear numbers and sizes in the gear sets are provided as a non-limiting example but it should be understood that the invention is not intended to be limited thereto.

It should also be understood that, in one aspect, the spring mechanism can also include an automatic winding mechanism in place of or in addition to the winding handle 1806. For example, some high end watches, such as Rolex®, include automatic winding mechanisms that automatically wind the watch mechanism using a rotating pendulum. Thus, the spring mechanism, in one aspect, includes any suitable automatic winding mechanism that is operable for automatically winding the spring mechanism, non-limiting examples of which include a weighted rotating pendulum, a solar powered rotating motor, a wind turbine, etc. For example, such an automatic winding mechanism can be operably connected with the winding gear 402 to cause rotation of the winding gear 402.

Engagingly coupled with the release gear set 1812 is an output drive 1814. The output drive 1814 is any suitable drive device that can be used in another toy or other device to provide rotational forces or work. As a non-limiting example, the output drive 1814 protrudes through a bottom portion of the enclosure 100 and can be affixed with one or more wheels of a toy car and effectively act as motor for the toy car. Thus, after winding the spring mechanism, upon actuation the spring release 1810, the leaf spring housing 200 is free to release the tension, which is released through the various gears and gear sets 1812, which ultimately causes rotation of the output drive 1814. In the toy car example, this would result in rotation the wheels of the toy car.

It should also be understood that a power distributor can optionally be included within the spring mechanism or attached with the output drive 1814 to regulate the distributing power of the spring mechanism. For example, in a watch, there is a component referred to as the escapement. The escapement is a mechanism which operates in a very precise manner in order to release increments of time through the gear train of a watch. The escapement transfers energy to the timekeeping element and allows the number of its oscillations to be counted (the "locking action"). Thus, the escapement operates, at least for the watch, as a power distributor to regulate the distributing power of the watch mechanism. Similarly and as understood by those skilled in the art, the spring mechanism can include any suitable power distributor that operates to regulate the distributing power of output drive 1814.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A spring mechanism, comprising:
   a leaf spring housing;
   a plurality of leaf springs affixed with the leaf spring housing, the leaf springs being flexible between a rest state and tension state;
   a winding mechanism operably engaged with the leaf springs for causing the leaf springs to flex from the rest state to the tension state; and
   wherein the winding mechanism includes a pushing pin wheel with a plurality of pushing pins protruding therefrom, the pushing pin wheel positioned proximate to the leaf spring housing such that each pushing pin rests against a leaf spring, with the pushing pin wheel being rotatable relative to the plurality of leaf springs such that rotation of the pushing pin wheel causes the leaf springs to flex from the rest state to the tension state.

2. The spring mechanism as set forth in claim 1, further comprising an enclosure, with the leaf spring housing rotatably mounted in the enclosure.

3. The spring mechanism as set forth in claim 2, wherein the leaf spring housing includes an inner hub, with the leaf springs radially disposed around the inner hub.

4. The spring mechanism as set forth in claim 3, wherein the leaf spring housing includes an outer wall with a plurality of outer spring holds, and wherein the inner hub includes a plurality of inner spring holds, such that the leaf springs are affixed between the outer spring holds and the inner spring holds.

5. The spring mechanism as set forth in claim 4, wherein the leaf spring housing includes a plurality of protruding peg pairs, with a leaf spring positioned adjacent to each protruding peg pair such that the protruding peg pair stops further flexion of the leaf springs when transitioning between the rest state and tension state.

6. The spring mechanism as set forth in claim 5, further comprising a gear plate affixed with the enclosure and affixing the pushing pin wheel in place with respect to the leaf springs and leaf spring housing.

7. The spring mechanism as set forth in claim 6, further comprising:
   a winding gear operably engaged with the pushing pin wheel;
   a winding gear set supported by the gear plate and operably engaged with the pushing pin wheel; and
   a winding device operably connected with the winding gear set, such that upon actuation of the winding device, the winding gear set is actuated to cause rotation of the winding gear and the pushing pin wheel, which causes the leaf springs to flex from the rest state to the tension state.

8. The spring mechanism as set forth in claim 7, further comprising:
   a leaf spring housing reverse rotating stopper engaged with the leaf spring housing to stop the leaf spring housing from reversing, thereby allowing the leaf spring housing to rotate in a single direction; and
   a pin wheel reverse rotating stopper engaged with the pushing pin wheel to stop the pushing pin wheel from reversing, thereby allowing the pushing pin wheel to rotate single direction in winding of the spring mechanism.

9. The spring mechanism as set forth in claim 8, further comprising:
   a release gear operably engaged with the leaf spring housing;
   a release gear set supported by the gear plate and operably engaged with the release gear; and
   an output drive operably engaged with the release gear set, whereby that upon actuation of the spring mechanism, the leaf springs release tension and return to the rest state from the tension state, which causes rotation of the leaf spring housing and rotation of the release gear and corresponding release gear set to cause rotation of the output drive.

10. The spring mechanism as set forth in claim 9, wherein the plurality of protruding peg pairs are substantially centrally disposed between the inner hub and outer wall.

11. The spring mechanism as set forth in claim 10, wherein the leaf springs are straight in the rest state and bent in the tension state.

12. The spring mechanism as set forth in claim 10, wherein the leaf springs are bent in the rest state and straight in the tension state.

13. The spring mechanism as set forth in claim 1, further comprising:
   a winding gear operably engaged with the pushing pin wheel;
   a winding gear set supported by a gear plate and operably engaged with the pushing pin wheel; and
   a winding device operably connected with the winding gear set, such that upon actuation of the winding device, the winding gear set is actuated to cause rotation of the winding gear and the pushing pin wheel, which causes the leaf springs to flex from the rest state to the tension state.

14. The spring mechanism as set forth in claim 1, wherein the leaf spring housing includes a plurality of protruding peg pairs, with a leaf spring positioned adjacent to each protruding peg pair such that the protruding peg pair stops further flexion of the leaf springs when transitioning between the rest state and tension state.

15. The spring mechanism as set forth in claim 1, further comprising:
   a release year operably engaged with the leaf spring housing;
   a gear plate affixed with the enclosure;
   a release gear set supported by the gear plate and operably engaged with the release gear; and
   an output drive operably engaged with the release gear set, whereby that upon actuation of the spring mechanism, the leaf springs release tension and return to the rest state from the tension state, which causes rotation of the leaf spring housing and rotation of the release gear and corresponding release gear set to cause rotation of the output drive.

16. A spring mechanism, comprising:
   a leaf spring housing;
   a plurality of leaf springs affixed with the leaf spring housing, the leaf swings being flexible between a rest state and tension state;
   a winding mechanism operably engaged with the leaf springs for causing the leaf springs to flex from the rest state to the tension state;
   wherein the leaf spring housing includes a plurality of protruding peg pairs, with a leaf spring positioned adjacent to each protruding peg pair such that the protruding peg pair stops further flexion of the leaf springs when transitioning between the rest state and tension state; and
   wherein the leaf spring housing includes an inner hub and an outer wall, and wherein the plurality of protruding peg pairs are substantially centrally disposed between the inner hub and outer wall.

17. The spring mechanism as set forth in claim 16, further comprising an enclosure, with the leaf spring housing rotatably mounted in the enclosure.

18. A spring mechanism comprising:
a leaf spring housing;
a plurality of leaf springs affixed with the leaf spring housing, the leaf springs being flexible between a rest state and tension state;
a winding mechanism operably engaged with the leaf springs for causing the leaf springs to flex from the rest state to the tension state; and
wherein the leaf spring housing includes a one piece inner hub shared by the plurality of leaf springs such that the leaf springs are connected with the shared one piece inner hub and radially disposed around the shared one piece inner hub in a common plane, with the leaf springs radially projecting away from the shared one piece inner hub in distinct directions from one another within the common plane.

19. The spring mechanism as set forth in claim 18, wherein the leaf spring housing includes an outer wall, with a plurality of outer spring holds formed in the outer wall and wherein the shared one piece inner hub includes a plurality of inner spring holds, such that the leaf springs are affixed between the outer spring holds and the inner spring holds.

* * * * *